UNITED STATES PATENT OFFICE.

LEO HERMANNS, OF HEIDELBERG, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS FOR THE PRODUCTION OF NEW DERIVATIVES OF THE HYDANTOIN.

1,285,703.  Specification of Letters Patent.  Patented Nov. 26, 1918.

No Drawing.  Application filed February 14, 1916.  Serial No. 78,248.

*To all whom it may concern:*

Be it known that I, LEO HERMANNS, Ph. D., chemist, a citizen of the Empire of Germany, residing at Heidelberg, in the Empire of Germany and State of Baden, have invented certain new and useful Improvements in Processes for the Production of New Derivatives of the Hydantoin, of which the following is a specification.

I have found that new γ-arylalkylhydantoins which are very valuable as hypnotics, are obtained by the action of hypohalogenites on arylalkylcyanacetamids. The transformation takes place in the sense of the following formula:

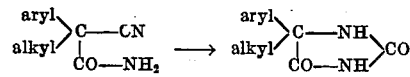

The new compounds are manufactured in the following manner:

Example: To a solution of 15.6 grams of phenylcyanacetamid (see *Americ. Chemical Journal*, vo. 32, 20) in 250 cc. of absolute alcohol is added a solution of 2.3 gr. of sodium in absolute alcohol. The sodium compound thus formed is converted into the phenylethylcyanacetamid by adding 11 gr. of ethylbromid and boiling on the water bath. After distilling off the largest part of the alcohol, the phenylethylcyanacetamid is precipitated by water (melting point 117° C.). It is easily soluble in hot diluted alcohol, difficultly soluble in ether and benzene.

15 grams of phenylethylcyanacetamid are heated to boiling with 225 cc. of hypobromite solution, prepared from 12.8 grams of bromin and a caustic soda lye of twenty-five per cent. strength. After cooling, some cc. of sulfurous acid are added, the whole is filtered, and the phenylethylhydantoin is precipitated by hydrochloric acid. Recrystallized from alcohol it constitutes a colorless compound which melts at 198° C., being readily soluble in acetone, alcohol and glacial acetic acid and insoluble in water and benzene; when combined with alkalis it forms salts which are readily soluble in water.

In the present process the hypohalogenites generally are equivalents of sodium hypobromite, and may be used in substitution therefor.

Having now described my invention, what I claim is:

1. A process for producing arylalkylhydantoins of the formula:

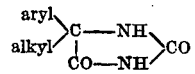

which consists in treating arylalkylcyanacetamid with hypohalogenites.

2. A process for producing phenylethylhydantoin of the formula:

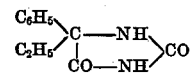

which consists in treating phenylethylcyanacetamid with sodium hypohalogenite.

3. As new products, the arylalkylhydantoins of the formula:

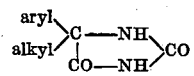

which are colorless compounds, insoluble in water, easily soluble in hot acetone, alcohol and glacial acetic acid and which dissolve also in cold diluted alkalis.

4. As a new product, the phenylethylhydantoin of the formula:

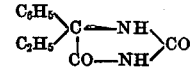

a colorless compound melting at 198° C., insoluble in water, easily soluble in hot acetone, alcohol and glacial acetic acid, forming with alkalis salts which are soluble in water.

In testimony whereof I affix my signature in presence of two witnesses.

LEO HERMANNS.

Witnesses:
 GUSTAV SCHILLING,
 C. LUNERS BROWN.